(12) United States Patent
Ichikawa

(10) Patent No.: US 11,669,099 B2
(45) Date of Patent: Jun. 6, 2023

(54) TIME MANAGEMENT SYSTEM, SERVER, AND CONTROL METHOD THEREOF

(71) Applicant: TOSHIBA TEC KABUSHIKI KAISHA, Tokyo (JP)

(72) Inventor: Takashi Ichikawa, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 17/324,369

(22) Filed: May 19, 2021

(65) Prior Publication Data

US 2022/0066462 A1 Mar. 3, 2022

(30) Foreign Application Priority Data

Aug. 25, 2020 (JP) .............................. JP2020-141880

(51) Int. Cl.
  *G05D 1/02* (2020.01)
(52) U.S. Cl.
  CPC ......... *G05D 1/0225* (2013.01); *G05D 1/0214* (2013.01); *G05D 1/0276* (2013.01); *G05D 1/0291* (2013.01); *G05D 2201/0213* (2013.01)

(58) Field of Classification Search
  CPC .. G05D 1/0225; G05D 1/0214; G05D 1/0276; G05D 1/0291; G05D 2201/0213; G06Q 10/083; G06Q 50/30; G06Q 10/02
  See application file for complete search history.

(56) References Cited

FOREIGN PATENT DOCUMENTS

JP 2004013754 A * 1/2004
JP 2019-133667 A 8/2019

* cited by examiner

*Primary Examiner* — Rodney A Butler
(74) *Attorney, Agent, or Firm* — Foley & Lardner LLP

(57) ABSTRACT

A time management system includes a terminal, a server, and a calculation unit. The terminal moves with the vehicle using the berth. The server connects the terminal via a network. The calculation unit calculates an estimated arrival time when the vehicle moving arrives at the berth based on position information. The server allocates a usage time of using the berth by the vehicle arriving at the berth at the estimated arrival time based on the estimated arrival time calculated by the calculation unit and a vacancy situation of the berth, and notifies the terminal moving together with the vehicle of the usage time allocated by the allocation unit. The terminal includes an output unit that the usage time notified from the server.

19 Claims, 12 Drawing Sheets

FIG. 4

| USAGE START TIME \ BERTH NUMBER | 1 | 2 | 3 | 4 | ... |
|---|---|---|---|---|---|
| 6:00 | 001 | | | | |
| 7:00 | | | | | |
| ⋮ | ⋮ | ⋮ | ⋮ | ⋮ | ⋮ |

FIG. 5

| VEHICLE ID | ESTIMATED ARRIVAL TIME | USAGE START TIME |
|---|---|---|
| | | |
| | | |
| ⋮ | ⋮ | ⋮ |

TIME MANAGEMENT SYSTEM, SERVER, AND CONTROL METHOD THEREOF

CROSS-REFERENCE TO RELATED APPLICATION

This application is based upon and claims the benefit of priority from Japanese Patent Application No. 2020-141880, filed on Aug. 25, 2020, the entire contents of which are incorporated herein by reference.

FIELD

Embodiments described herein relate generally to a time management system and server, and a control method thereof.

BACKGROUND

Distribution facilities have so-called berths where conveying vehicles such as trucks ride up to for the delivery of luggage. Since the berths are used on a first-come-first-served basis, a queue of the conveying vehicles may occur. Therefore, in recent years, various time management systems have been devised in which a driver driving a conveying vehicle reserves a date and time for using a berth in advance to secure the berth.

DESCRIPTION OF THE DRAWINGS

FIG. 4 is a schematic diagram illustrating an example of a reservation management table;

FIG. 5 is a schematic view illustrating an example of a vehicle management table;

DETAILED DESCRIPTION

In some cases, due to congestion or the like of a conveyance path, a driver may arrive earlier than the reserved time, or the driver may arrive later than the reserved time. In the case where the driver arrives earlier than the reserved time, the driver may wait in front of the distribution facility until the reserved time. In the case where the driver arrives later than the reserved time, there may be an inconvenience in that the secured berth is not used, and the driver may make a reservation again. Therefore, it is necessary to construct a mechanism for performing reservation management of berths in response to the situation during conveyance. The present disclosure is related to providing a time management system and a server capable of performing reservation management of a berth (dock) in response to a situation during conveyance, and a control method thereof.

According to at least one embodiment, a time management system includes a terminal, a server, and a calculation unit (calculator). The terminal moves together with a vehicle using a berth. The server connects to the terminal via a network. The calculation unit calculates an estimated arrival time when the vehicle moving together with the terminal arrives at the berth based on position information between the terminal and the berth. The server includes an allocation unit (allocator) and a notification unit (notifier). The allocation unit allocates a usage time of using the berth by the vehicle arriving at the berth at the estimated arrival time based on the estimated arrival time calculated by the calculation unit and a vacancy situation of the berth. The notification unit notifies the terminal moving together with the vehicle arriving at the berth at the estimated arrival time of the usage time allocated by the allocation unit. The terminal includes an output unit (transmitter). The output unit outputs the usage time notified from the server.

Hereinafter, one embodiment will be described with reference to the drawings. It is noted that the embodiment exemplifies a time management system that manages a usage time of a berth from a time when a conveying vehicle is estimated to arrive at the berth of a distribution facility.

Figure 1:
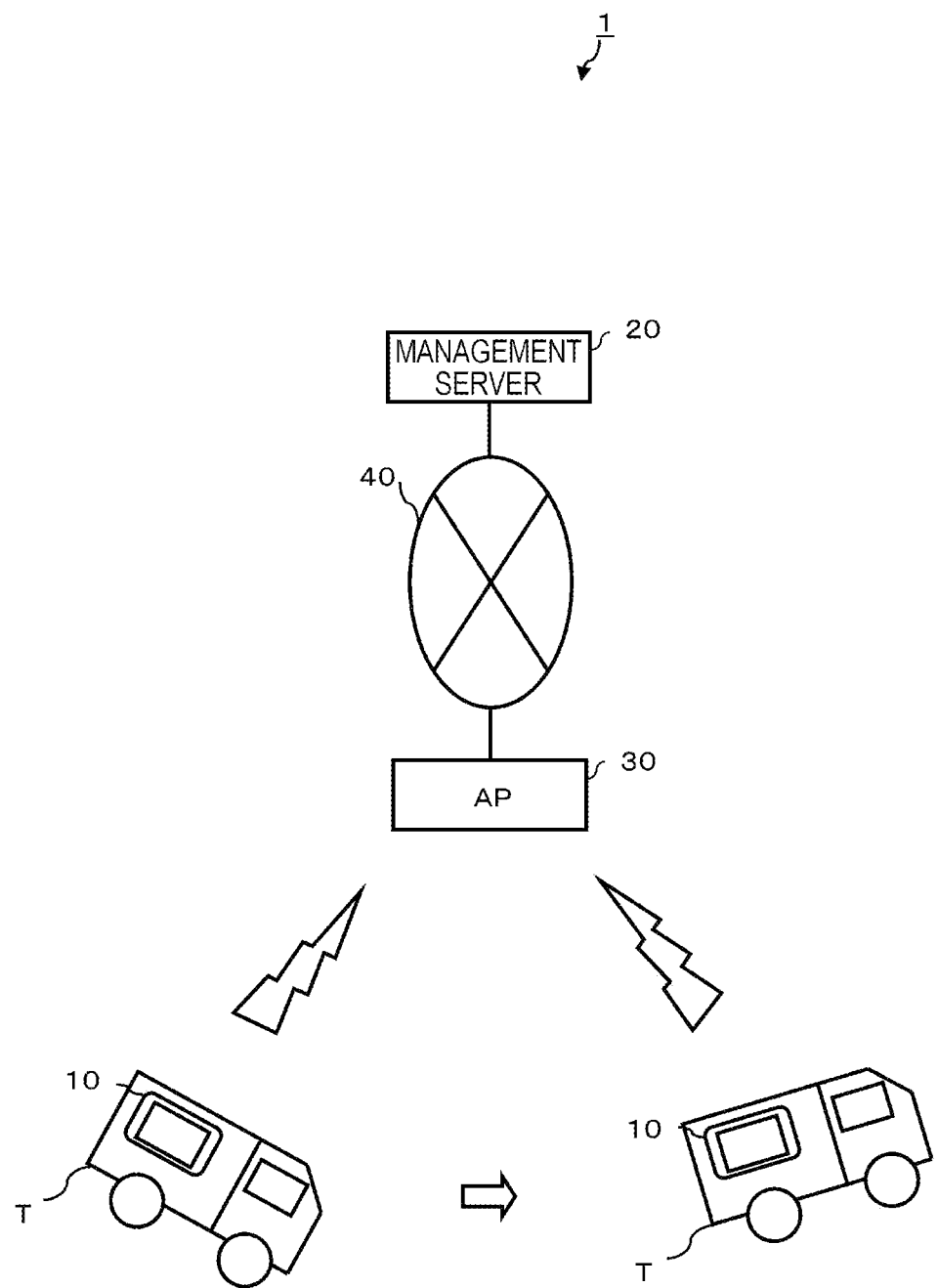
FIG. 1 is a schematic diagram illustrating a schematic configuration of a time management system according to an embodiment.

FIG. 1 is a schematic diagram illustrating a schematic configuration of a time management system 1 according to an embodiment.

The time management system 1 includes an information terminal 10, a management server 20, an access point 30 (communicator), and a communication network 40. The information terminal 10 moves together with a conveying vehicle T such as a truck. The information terminal 10 enables wireless communication with the access point 30. The information terminal 10 is connected to the access point 30 by wireless communication and can perform data communication with the management server 20 via the communication network 40. The information terminal 10 is an electronic device including an input device and a display device. For example, a smartphone, a tablet terminal, a car navigation system, or the like may be used as the information terminal 10. The management server 20 is a computer device that controls operations of the time management system 1 in an integrated manner. The management server 20 controls a reservation processing task performed via the information terminal 10. The communication network 40 connects the information terminal 10 and the management server 20 via a wired or wireless connection. For example, the Internet may be used as the communication network 40.

Figure 2:
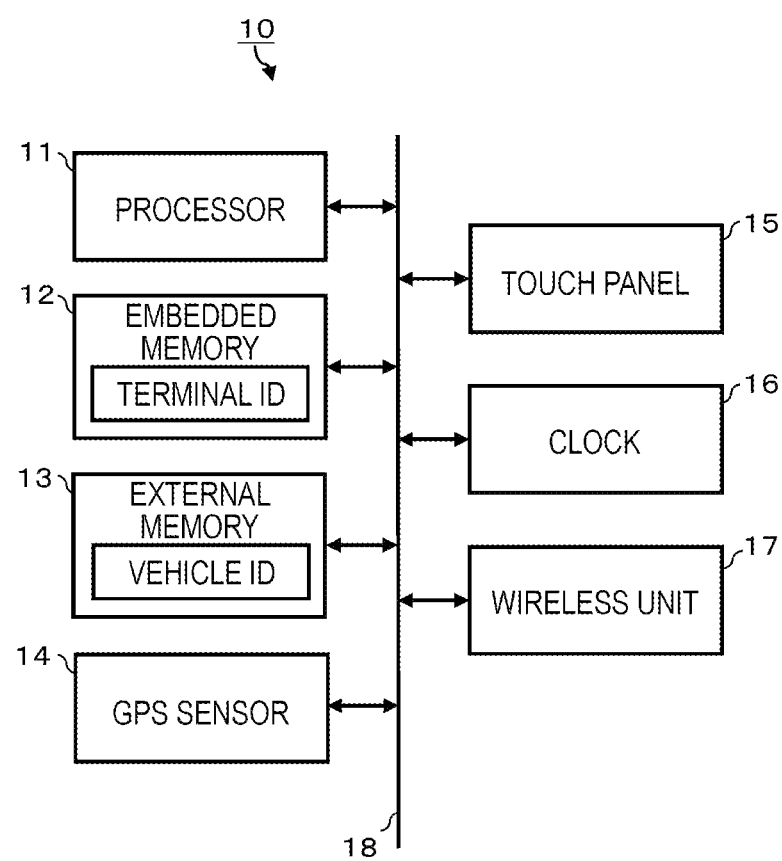
FIG. 2 is a block diagram illustrating a configuration of a main circuit of an information terminal.

FIG. 2 is a block diagram illustrating a configuration of a main circuit of the information terminal 10. As illustrated in FIG. 2, the information terminal 10 includes a processor 11, an embedded memory 12, an external memory 13, a global positioning system (GPS) sensor 14, a touch panel 15, a clock 16, a wireless unit 17, and a system transmission line 18. The system transmission line 18 includes an address bus, a data bus, a control signal line, and the like. The information terminal 10 connects the processor 11, the embedded memory 12, the external memory 13, the GPS sensor 14, the touch panel 15, the clock 16, and the wireless unit 17 to the system transmission line 18. Then, the processor 11, the embedded memory 12, and the external memory 13 are connected by the system transmission line 18, and a computer is configured which performs information processing for controlling the information terminal 10.

The processor 11 corresponds to a central portion of the computer. The processor 11 controls each component in order to realize various functions as the information terminal 10 according to an operating system or an application program. The processor 11 may be, for example, a central processing unit (CPU).

The embedded memory 12 corresponds to a main memory portion of the computer. The embedded memory 12 includes a non-volatile memory area and a volatile memory area. The embedded memory 12 stores the operating system or the application program in a non-volatile memory area. The embedded memory 12 stores data necessary for the processor 11 to execute the processes for controlling each component in the volatile memory area. The embedded memory 12 uses the volatile memory area as a work area where data is appropriately rewritable by the processor 11. The non-volatile memory area may be, for example, a read only memory (ROM). The volatile memory area may be, for example, a random access memory (RAM).

The external memory 13 corresponds to an auxiliary storage portion of the computer. For example, a Secure Digital (SD) memory card, a Universal Serial Bus (USB) memory, or the like can be the external memory 13. The external memory 13 stores data used by the processor 11 to perform various processes, data generated by the processes of the processor 11, and the like. In some cases, the external memory 13 may store the above-described application program.

A time management application program is included in the application program stored in the external memory 13. Hereinafter, the time management application program is abbreviated as a time management application. The time management application is used when berth reservation for a distribution facility in which the time management system 1 is introduced is performed. A method of installing the time management application in the external memory 13 is not particularly limited. The control program can be recorded on a removable recording medium, or the control program can be distributed by communication via a network and installed in the external memory 13. The recording medium may be in any form as long as the recording medium such as a compact disc-ROM (CD-ROM) or a memory card can store a program and the recording medium are readable by a device. It is noted that the time management application may be installed in the embedded memory 12 instead of the external memory 13.

The GPS sensor 14 uses a global positioning system (GPS) to measure a current position (latitude/longitude) of the information terminal 10.

The touch panel 15 is a device including both an input device and a display device of the information terminal 10. The touch panel 15 detects a touch position with respect to a displayed image and outputs touch position information to the processor 11.

The clock 16 functions as a time information source for the information terminal 10. The processor 11 measures a current date and time based on time information measured by the clock 16.

The wireless unit 17 performs wireless data communication with the access point 30 according to a wireless communication protocol.

The information terminal 10 having such a configuration stores a terminal identification (ID) in the non-volatile memory area of the embedded memory 12. The terminal ID is terminal identification data set for each information terminal 10 in order to individually identify each information terminal 10.

The information terminal 10 stores a vehicle ID in the external memory 13. The vehicle ID is a unique code allocated to each vehicle to identify the vehicle. The vehicle is the conveying vehicle T for which vehicle registration is performed in order to use the time management system 1.

Figure 3:
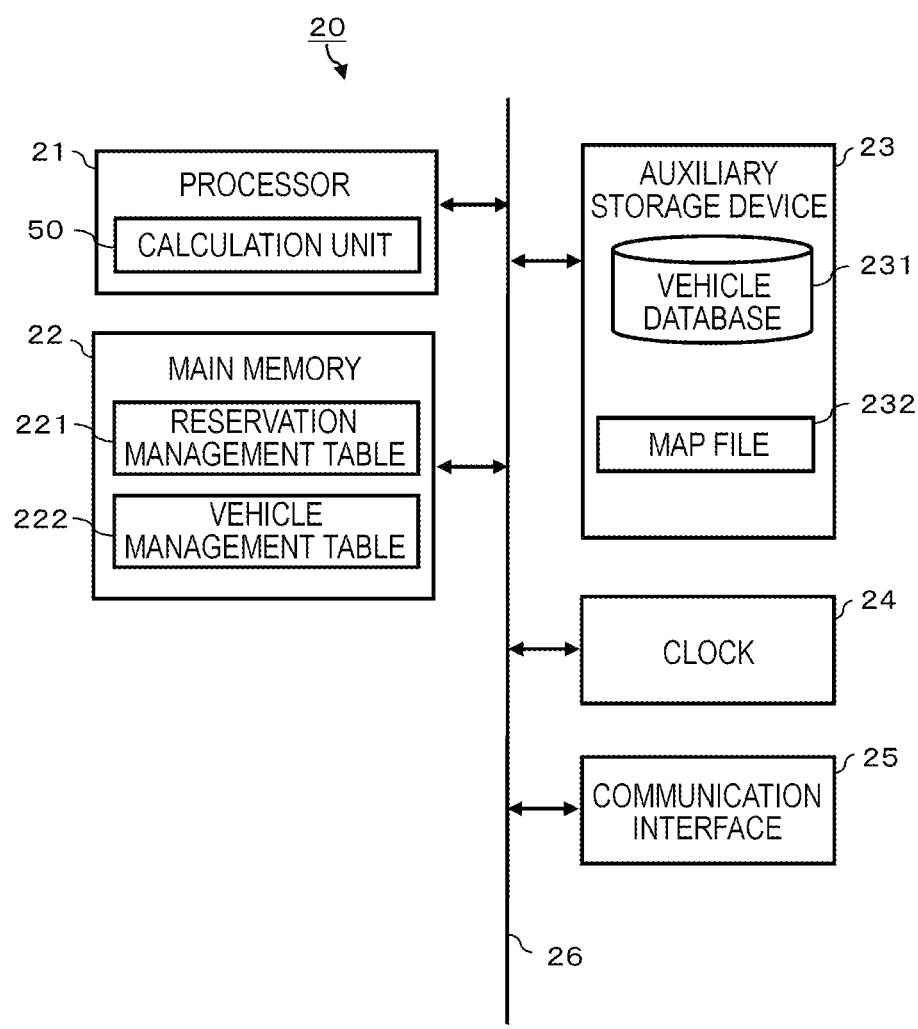
FIG. 3 is a block diagram illustrating a configuration of a main circuit of a management server.

FIG. 3 is a block diagram illustrating a configuration of a main circuit of the management server 20. The management server 20 includes a processor 21, a main memory 22, an auxiliary storage device 23, a clock 24, a communication interface 25, and a system transmission line 26. The system transmission line 26 includes an address bus, a data bus, a control signal line, and the like. The management server 20 connects the processor 21, the main memory 22, the auxiliary storage device 23, the clock 24, and the communication interface 25 to the system transmission line 26. In the management server 20, a computer is configured with the processor 21, the main memory 22, the auxiliary storage device 23, and the system transmission line 26 connecting the above-mentioned components.

The processor 21 corresponds to the central portion of the computer. The processor 21 controls each component in order to realize various functions as the management server 20 according to the operating system or the application program. The processor 21 is, for example, a CPU. The processor 21 includes a calculation unit 50 (calculator). The calculation unit 50 calculates an estimated arrival time when the conveying vehicle T moving together with the information terminal 10 arrives at the berth based on position information between the information terminal 10 and the berth.

The main memory 22 corresponds to a main memory portion of the computer. The main memory 22 includes the non-volatile memory area and the volatile memory area. The main memory 22 stores an operating system or an application program in the non-volatile memory area. In some cases, the main memory 22 may store data necessary for the processor 21 to execute a process for controlling each component in the non-volatile or volatile memory area. The main memory 22 uses the volatile memory area as a work area where data is appropriately rewritable by the processor 21. The non-volatile memory area is, for example, a ROM. The volatile memory area is, for example, a RAM.

The auxiliary storage device 23 corresponds to an auxiliary storage portion of the computer. As the auxiliary storage device 23, there are, for example, an electric erasable programmable read-only memory (EEPROM®), a hard disk drive (HDD), a solid state drive (SSD), or the like. The auxiliary storage device 23 stores data used by the processor 21 to perform various processes, data generated by the processes of the processor 21, and the like. In some cases, the auxiliary storage device 23 may store the above-described application program.

The clock 24 functions as a time information source for the management server 20. The processor 21 measures a current date and time based on time information measured by the clock 24.

The communication interface 25 is connected to the communication network 40. The communication interface 25 performs data communication with another device connected via the communication network 40 according to a communication protocol.

The management server 20 having such a configuration stores a reservation management table 221 (refer to FIG. 4) and a vehicle management table 222 (refer to FIG. 5) in the volatile memory area of the main memory 22.

FIG. 4 is a schematic diagram illustrating an example of the reservation management table 221. As illustrated in FIG. 4, the reservation management table 221 has a field for storing the vehicle ID in association with a usage start time and a berth number. The usage start time is the start time when the berth is usable. It is noted that, in the embodiment, the time, that is, the usage time from the usage start time to the next usage start time is in units of one hour. The berth number is a unique number allocated to the berth to individually identify a plurality of the berths of the distribution facility. Incidentally, when the vehicle ID is not stored, a null value is set in the field. For example, the vehicle having the vehicle ID of "001" can use the berth of number 1 from 6:00 to 7:00 by reservation. In the reservation management table 221, the usage start time is associated with the berth number, but the usage time from the usage start time to the usage end time may be associated with the berth number. The reservation management table 221 is updated every time reservation is changed.

FIG. 5 is a schematic view illustrating an example of the vehicle management table 222. As illustrated in FIG. 5, the vehicle management table 222 is a data table configured with the vehicle ID, the estimated arrival time, and the usage start time. The estimated arrival time is a time of arrival at the distribution facility, which is estimated based on a situation of the conveyance path from the current position of the information terminal 10 moving together with the conveying vehicle T to the distribution facility. The fields associated with the vehicle management are not limited to the above-mentioned items. The vehicle management table 222 is updated every time the reservation is changed.

The description returns to FIG. 3.

The management server 20 stores a vehicle database 231 and a map file 232 in the auxiliary storage device 23. The vehicle database 231 stores a vehicle data record generated for each conveying vehicle T for which vehicle registration of the time management application has been performed. The vehicle data record includes a vehicle ID, a vehicle type, a vehicle number, a terminal ID, and the like. The vehicle ID is generated when the vehicle registration of the time management application installed in the information terminal 10 is performed. The terminal ID is acquired from the information terminal 10 for which the vehicle registration is performed. The map file 232 stores, for example, road map data of the conveyance path area.

Figure 6:
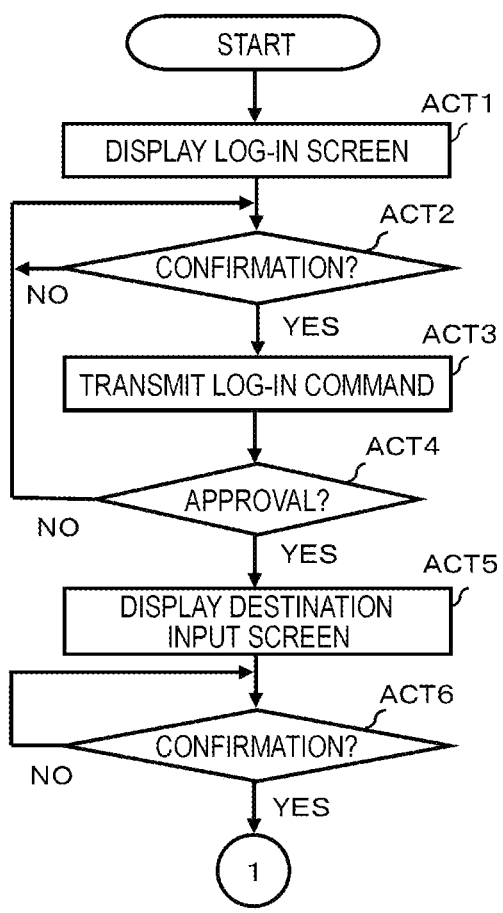
FIG. 6 is a flowchart illustrating a procedure of controlling main components of a processor in the information terminal.
Figure 7:
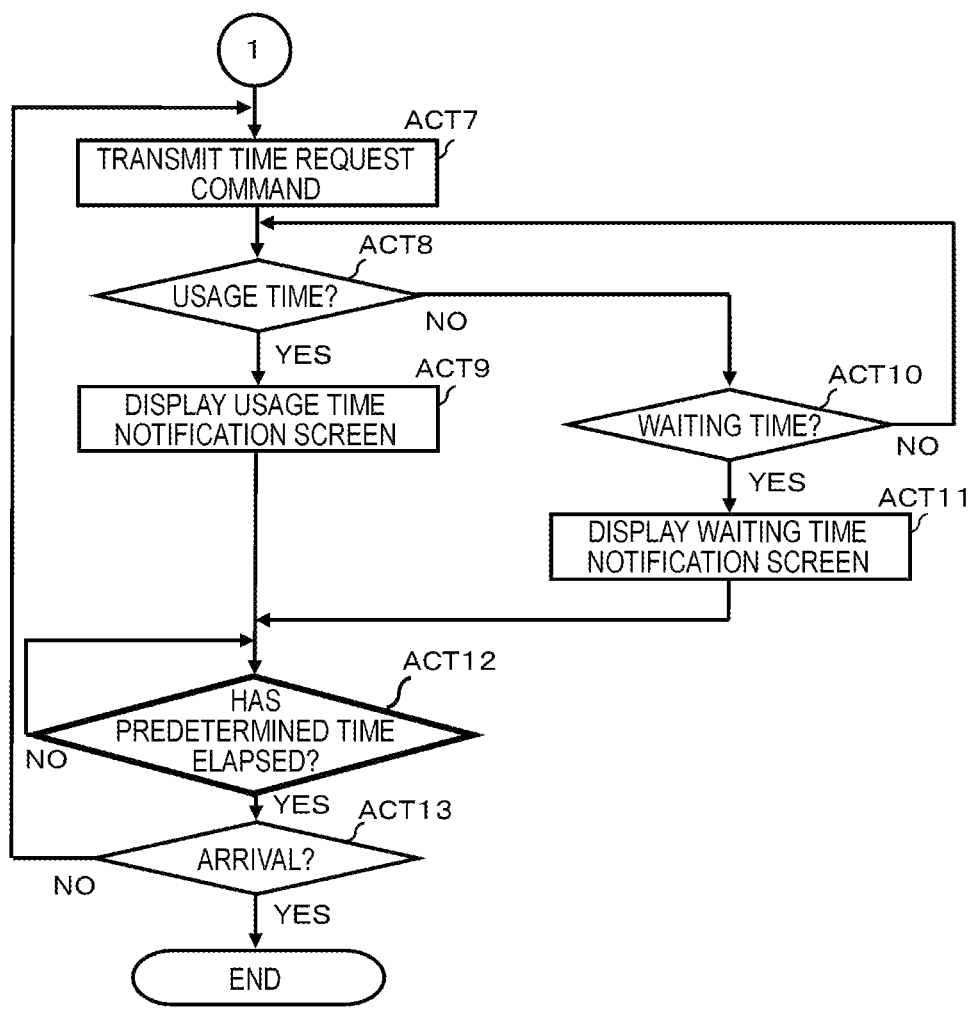
FIG. 7 is a flowchart illustrating a procedure of controlling main components of the processor in the information terminal.

FIGS. 6 and 7 are flowcharts illustrating a procedure of main information processing executed by the processor 11 of the information terminal 10. FIGS. 8 to 11 are flowcharts illustrating a procedure of main information processing executed by the processor 21 of the management server 20. Hereinafter, the operations of the time management system 1 will be described with reference to the figures. It is noted that the procedure of the operations and contents thereof described below are examples. As long as similar results can be obtained, the procedure and contents are not limited.

First, the driver boarding the conveying vehicle T toward the distribution facility activates the time management application of the information terminal 10. When the time management application is activated, the processor 11 starts information processing of the procedure illustrated in the flowchart of FIG. 6.

As ACT1, the processor 11 allows the touch panel 15 to display a log-in screen. The log-in screen is a screen for instructing the driver to perform a log-in operation. Although not illustrated, an input field for inputting a vehicle ID and a confirm button for instructing confirmation of input are displayed on the log-in screen. After checking the log-in screen, the driver inputs the vehicle ID in the input field and touches the confirm button.

As ACT2, the processor 11 checks whether the confirm button is touched. When the confirm button is touched, in ACT2, the processor 11 determines YES and proceeds to ACT3. As ACT3, the processor 11 controls the wireless unit 17 to transmit a log-in command to the management server 20. By such control, the wireless unit 17 wirelessly transmits the log-in command. The log-in command is received by the access point 30 and transmitted to the management server 20 via the communication network 40. The log-in command includes the vehicle ID.

Figure 8:
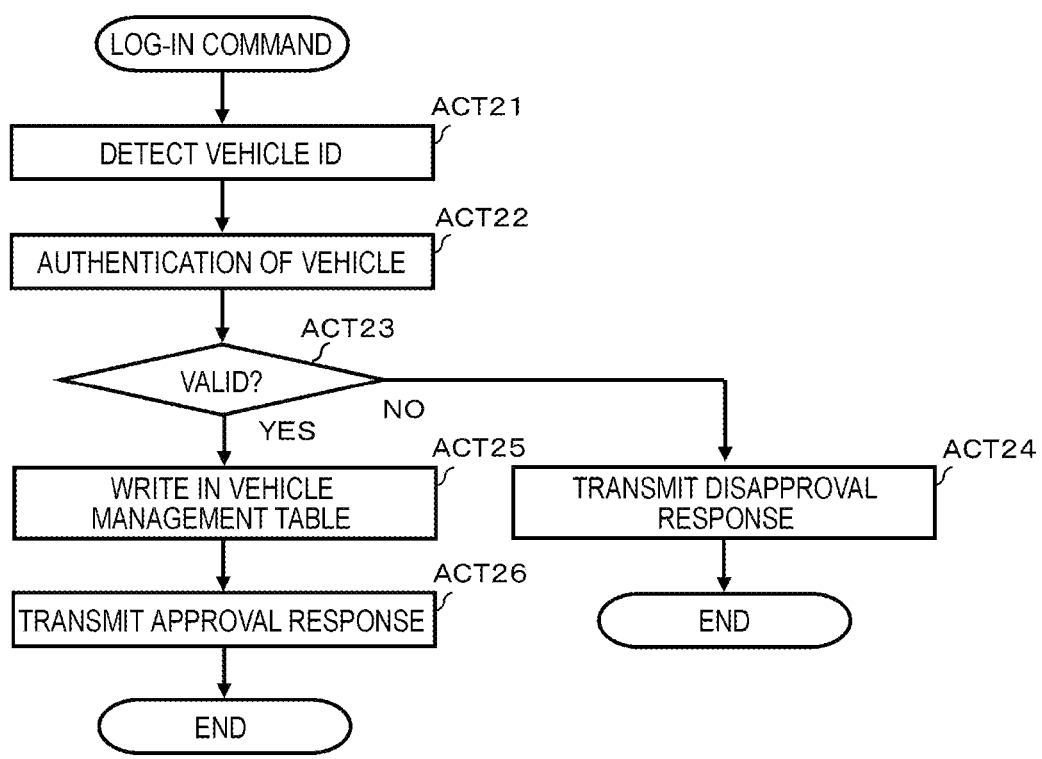
FIG. 8 is a flowchart illustrating a procedure of controlling main components of the processor in the management server.

The processor 21 of the management server 20 that has received the log-in command starts a command reception process of the procedure illustrated in the flowchart of FIG. 8.

As ACT21, the processor 21 detects the vehicle ID from the log-in command. Then, as ACT22, the processor 21 performs authentication of the vehicle identified by the vehicle ID. Specifically, the processor 21 checks whether a vehicle data record including the vehicle ID exists in the vehicle database 231. When the corresponding vehicle data record exists in the vehicle database 231, the processor 21 determines that the authentication of the vehicle is valid. On the other hand, when the corresponding vehicle data record does not exist in the vehicle database 231, the processor 21 determines that the authentication of the vehicle is invalid.

As ACT23, the processor 21 checks the result of authentication of the vehicle. Herein, where the result of the authentication is invalid, in ACT23, the processor 21 determines NO and proceeds to ACT24. As ACT24, the processor 21 controls the communication interface 25 to transmit a disapproval response command to the information terminal 10. By such control, the disapproval response command is transmitted through the communication interface 25. The disapproval response command is wirelessly transmitted from the access point 30 via the communication network 40 and is received by the information terminal 10 which is a log-in command transmission source. With the above-described configuration, the processor 21 ends a log-in command reception process.

When the authentication result is valid, in ACT23, the processor 21 determines YES and proceeds to ACT25. As ACT25, the processor 21 writes the vehicle ID in the vehicle management table 222.

As ACT26, the processor 21 controls the communication interface 25 to transmit an approval response command to the information terminal 10. By such control, the approval response command is transmitted through the communication interface 25. The approval response command is wirelessly transmitted from the access point 30 via the communication network 40 and is received by the information terminal 10 which is a log-in command transmission source. With the above-described configuration, the processor 21 ends a log-in command reception process.

The description returns to FIG. 6.

As ACT4, the processor 11 of the information terminal 10 that controls the transmission of the log-in command in ACT3 waits for the response command from the management server 20. When the disapproval response command has been received from the management server 20, in ACT4, the processor 11 determines NO and returns to ACT2. Therefore, the driver performs log-in again.

When the approval response command has been received from the management server 20, in ACT4, the processor 11 determines YES and proceeds to ACT5. As ACT5, the processor 11 allows the touch panel 15 to display a destination input screen 100 (refer to FIG. 12).

Figure 12:
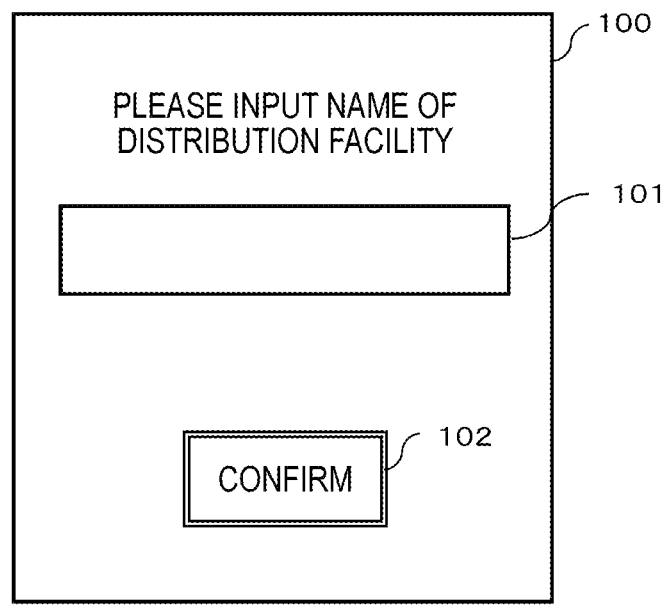
FIG. 12 is a schematic diagram illustrating an example of a destination input screen.

FIG. 12 is a schematic view illustrating an example of the destination input screen 100. As illustrated in FIG. 12, on the destination input screen 100, an input field 101 is displayed together with text data prompting to input a name of the distribution facility which is the destination. It is noted that the content of the text data displayed in FIG. 12 is an example. An image of the confirm button 102 for instructing the input confirmation is displayed. The confirm button 102 is initially grayed out, and an operation input is invalidated. The driver inputs the name of the distribution facility in the input field 101 and touches the confirm button 102.

The description returns to FIG. 6.

As ACT6, the processor 11 checks whether the confirm button 102 is touched. When the confirm button 102 is touched, in ACT6, the processor 11 determines YES and proceeds to ACT7 in FIG. 7. As ACT7, the processor 11 controls the wireless unit 17 to transmit a time request command to the management server 20. By such control, the wireless unit 17 wirelessly transmits the time request command. The time request command is received by the access point 30 and transmitted to the management server 20 via the communication network 40. The time request command includes the vehicle ID and situation data. The situation data are, for example, the name of the distribution facility, the current time, and the current position. The name of the distribution facility is input in the input field 101 of the destination input screen 100. The current time is a transmission start time of the time request command measured by the clock 16. The current position is a position of the information terminal 10 at the transmission start time of the time request command, which is positioned by the GPS sensor 14.

Figure 9:
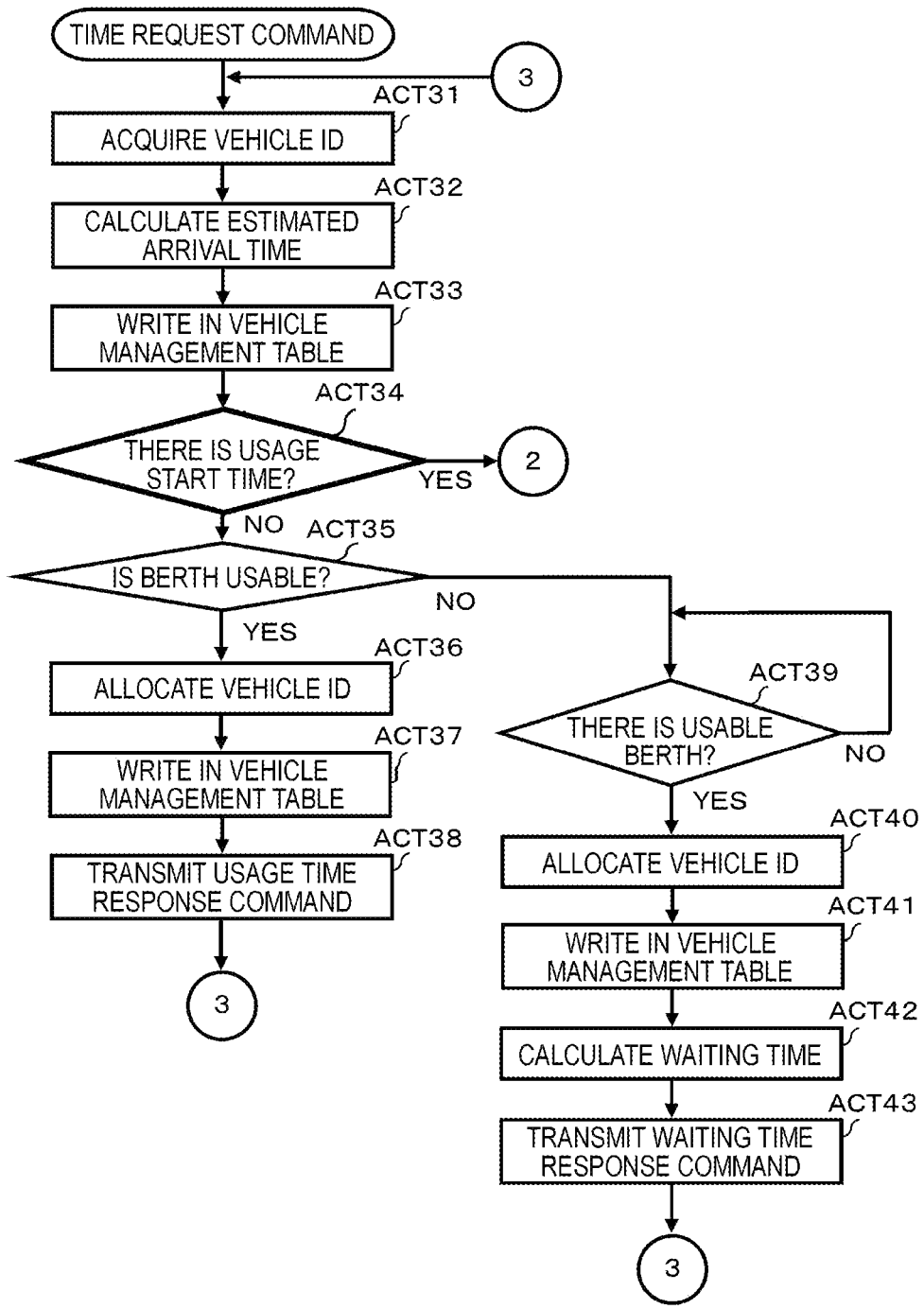
FIG. 9 is a flowchart illustrating a procedure of controlling main components of the processor in the management server.

The processor 21 of the management server 20 that has received the time request command starts the command reception process of the procedure illustrated in the flowchart of FIG. 9.

As ACT31, the processor 21 acquires the vehicle ID from the time request command.

As ACT32, the processor 21 calculates the estimated arrival time at the distribution facility based on the situation data included in the time request command by the calculation unit 50 and the road map data stored in the map file 232.

As ACT33, the processor 21 writes the estimated arrival time in the vehicle management table 222.

As ACT34, the processor 21 checks whether the usage start time is stored in the field in the same row as the estimated arrival time written in the vehicle management table 222.

When the usage start time is not stored, in ACT34, the processor 21 determines NO and proceeds to ACT35. As ACT35, by referring to the reservation management table 221, the processor 21 checks whether the berth is usable at the usage start time derived from the estimated arrival time. The usage start time derived from the estimated arrival time is the earliest time when the working time for delivering the luggage with the berth can be secured. For example, when it is assumed that the working time is 50 minutes, the usage start time is set until the estimated arrival time is 10 minutes after the usage start time set in the reservation management table 221. When 10 minutes have passed from the usage start time, the usage start time set next to the usage start time is set. It is noted that, in the embodiment, the working time is set to be uniform. The working time may be set for each conveying vehicle T.

When the berth is usable at the usage start time derived from the estimated arrival time, in ACT35, the processor 21 determines YES and proceeds to ACT36. As ACT36, the processor 21 allocates the vehicle ID to the reservation management table 221 in association with the usage start time and the berth number. It is noted that, when there are vacancies in a plurality of fields with respect to the usage start time, the processor 21 selects, for example, a field having a small berth number.

As ACT37, by referring to the vehicle management table 222, the processor 21 writes the usage start time in the field in the same row as the estimated arrival time.

As ACT38, the processor 21 controls the communication interface 25 to transmit a usage time response command to the information terminal 10. By such control, the usage time response command is transmitted through the communication interface 25. The usage time response command is wirelessly transmitted from the access point 30 via the communication network 40 and is received by the information terminal 10 which is a time request command transmission source. The usage time response command includes an estimated arrival time, a usage time based on the usage start time, and a berth number. The processor 21 that has completed the process of ACT38 returns to ACT31.

When the berth is not usable at the usage start time derived from the estimated arrival time, in ACT35, the processor 21 determines NO and proceeds to ACT39. As ACT39, the processor 21 checks whether there is a usable berth at the usage start time after the usage start time derived from the estimated arrival time. That is, the processor 21 checks whether there is a vacancy in the field of the reservation management table 221 for the usage start time after the usage start time derived from the estimated arrival time. When there is a usable berth, in ACT39, the processor 21 determines YES and proceeds to ACT40. As ACT40, the processor 21 allocates the vehicle ID to the reservation management table 221 in association with the usage start time and the berth number. As ACT41, the processor 21 writes the usage start time with reference to the vehicle management table 222.

As ACT42, the processor 21 calculates a waiting time based on the estimated arrival time and the usage start time. The waiting time is the difference time between the estimated arrival time and the usage start time.

As ACT43, the processor 21 controls the communication interface 25 to transmit a waiting time response command to the information terminal 10. By such control, the waiting time response command is transmitted through the communication interface 25. The waiting time response command is wirelessly transmitted from the access point 30 via the communication network 40 and is received by the information terminal 10 which is a time request command transmission source. The waiting time response command includes the estimated arrival time, the usage time and the berth number based on the usage start time, and the waiting time.

The description returns to FIG. 7.

As ACT8, the processor 11 of the information terminal 10 that has controlled the transmission of the time request command in ACT7 waits for the usage time response command from the management server 20. When the usage time response command has been received from the management server 20, in ACT8, the processor 21 determines YES and proceeds to ACT9. As ACT9, the processor 21 allows the touch panel 15 to display a usage time notification screen 200 (refer to FIG. 13).

Figure 13:
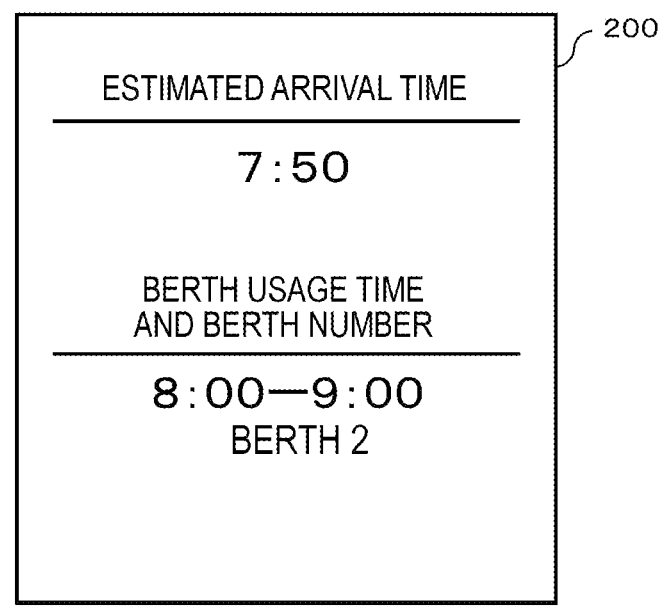
FIG. 13 is a schematic diagram illustrating an example of a usage time notification screen.

FIG. 13 is a schematic view illustrating an example of the usage time notification screen 200. As illustrated in FIG. 13, the estimated arrival time, the usage time and the berth number based on the usage start time are displayed on the usage time notification screen 200. It is noted that the content of the text data displayed in FIG. 13 is an example.

The description returns to FIG. 7.

When the usage time response command has not been received from the management server 20, in ACT8, the processor 21 determines NO and proceeds to ACT10. As ACT10, the processor 21 checks whether the waiting time response command has been received. When the waiting time response command has not been received, in ACT10, the processor 21 determines NO and returns to ACT8.

When the waiting time response command has been received, in ACT10, the processor 21 determines YES and proceeds to ACT11.

Figure 14:
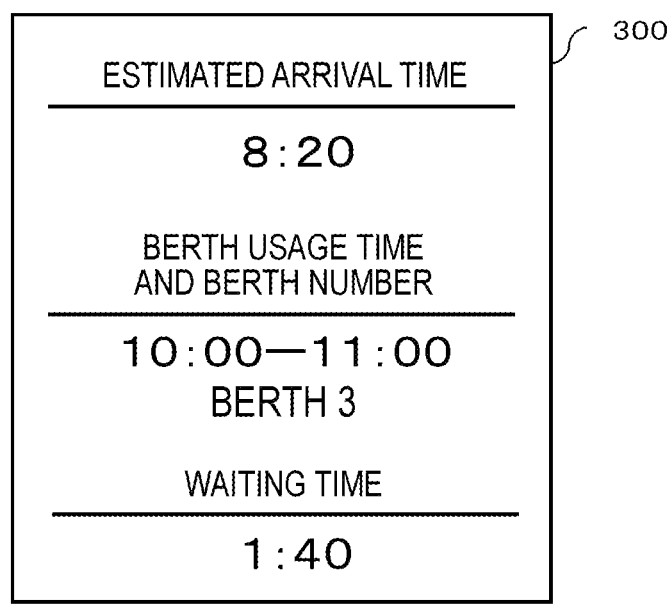
FIG. 14 is a schematic diagram illustrating an example of a waiting time notification screen.

As ACT11, the processor 21 allows the touch panel 15 to display a waiting time notification screen 300 (refer to FIG. 14).

FIG. 14 is a schematic view illustrating an example of the waiting time notification screen 300. As illustrated in FIG. 14, the waiting time notification screen 300 displays the estimated arrival time, the usage time and the berth number based on the usage start time, and the waiting time. It is noted that the content of the text data displayed in FIG. 14 is an example.

The description returns to FIG. 7.

After completing the process of ACT9 or ACT11, the processor 11 checks whether the predetermined time has elapsed as ACT12. The predetermined time is, for example, 5 minutes, 10 minutes, or the like. When the predetermined time has elapsed, in ACT12, the processor 11 determines YES and proceeds to ACT13.

As ACT13, the processor 11 checks whether the vehicle has arrived at the distribution facility. When the vehicle has arrived at the distribution facility, in ACT13, the processor 11 determines YES and ends the information processing of the procedure illustrated in the flowchart of FIG. 7.

When the vehicle has not arrived at the distribution facility, in ACT13, the processor 11 determines NO and returns to ACT7. That is, the processor 11 transmits a time request command to the management server 20 every time a predetermined time elapses until the vehicle arrives at the distribution facility. Then, the processor 11 repeatedly executes the processes of ACT7 to ACT13.

The description returns to FIG. 9.

Figure 10:
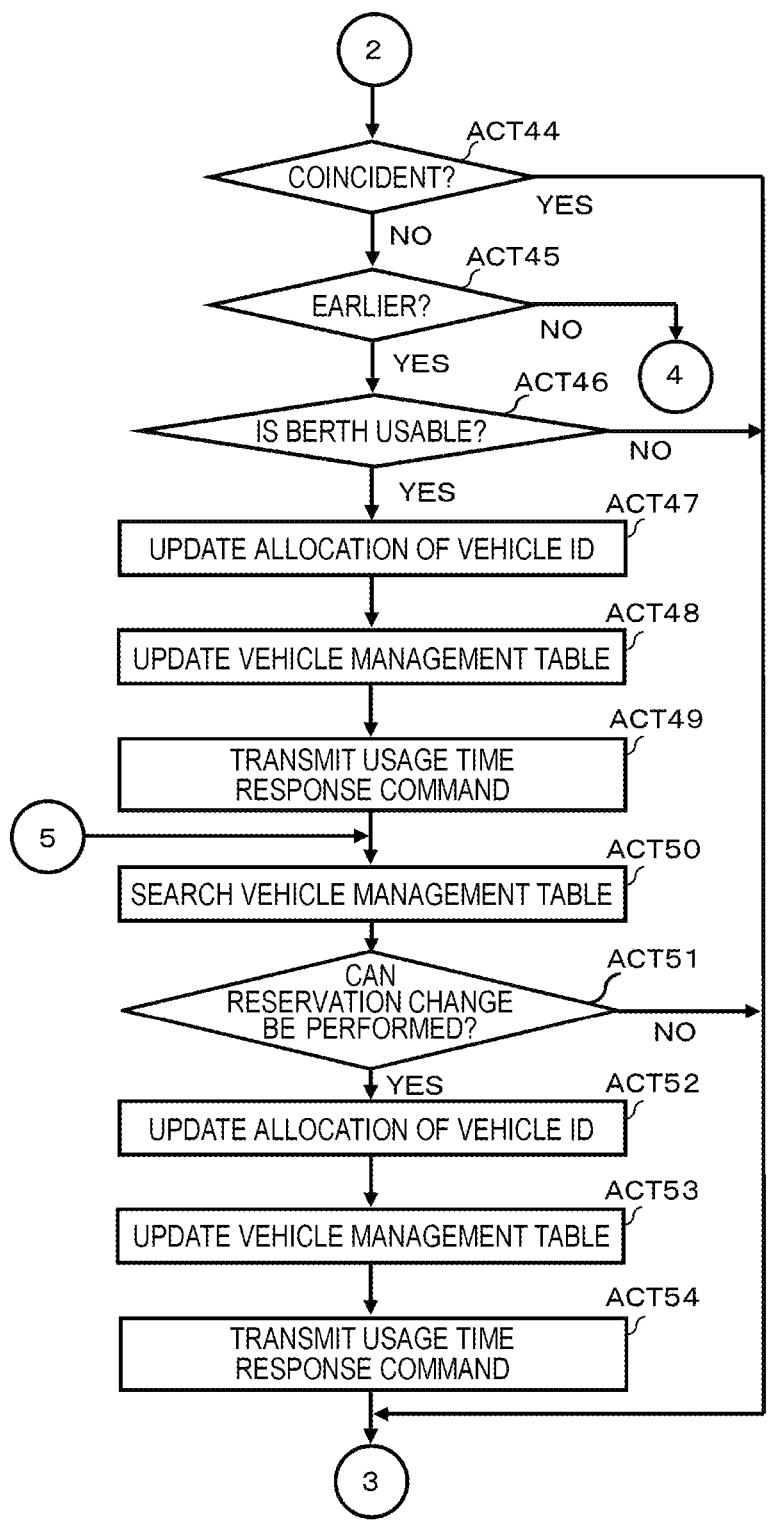
FIG. 10 is a flowchart illustrating a procedure of controlling main components of the processor in the management server.

When the usage start time is stored, in ACT34, the processor 21 determines YES and proceeds to ACT44 in FIG. 10. As ACT44, the processor 21 checks whether the usage start time stored and the usage start time derived from the estimated arrival time are different.

When the usage start times are coincident (the same, equal, etc.), in ACT44, the processor 21 determines YES and returns to ACT31 in FIG. 9.

When the usage start times are not coincident (different, not equal, etc.), in ACT44, the processor 21 determines NO and proceeds to ACT45. As ACT45, the processor 21 checks whether the usage start time derived from the estimated arrival time is earlier than the usage start time stored.

When the usage start time derived from the estimated arrival time is earlier than the stored usage start time, in ACT45, the processor 21 determines YES and proceeds to ACT46.

As ACT46, by referring to the reservation management table 221, the processor 21 checks whether the berth is usable at the usage start time derived from the estimated arrival time.

When the berth is not usable at the usage start time derived from the estimated arrival time, in ACT46, the processor 21 determines NO and returns to ACT31 in FIG. 9.

When the berth is usable at the usage start time derived from the estimated arrival time, in ACT46, the processor 21 determines YES and proceeds to ACT47. As ACT47, the processor 21 updates the allocation of the vehicle ID in the reservation management table 221 in association with the usage start time and the berth number. That is, the processor 21 deletes the vehicle ID already stored in the reservation management table 221 and sets the null value. Then, the processor 21 newly stores the vehicle ID in the allocated field.

As ACT48, by referring to the vehicle management table 222, the processor 21 updates the usage start time of the field in the same row as the estimated arrival time. That is, the processor 21 deletes the usage start time already stored in the vehicle management table 222, and newly writes the usage start time derived from the estimated arrival time.

As ACT49, the processor 21 controls the communication interface 25 to transmit the usage time response command to the information terminal 10. By such control, the usage time response command is transmitted through the communication interface 25. The usage time response command is wirelessly transmitted from the access point 30 via the communication network 40 and is received by the information terminal 10 which is a time request command transmission source. The usage time response command includes the estimated arrival time, the usage time and the berth number based on the usage start time.

As ACT50, the processor 21 searches the vehicle management table 222. As ACT51, the processor 21 checks whether there is a vehicle ID of which reservation can be changed at the usage start time before updating in the process of ACT48. That is, the processor 21 checks whether there is a vehicle ID of which the usage start time written in the vehicle management table 222 is later than the usage start time before the updating although the usage start time before the updating is the usage start time derived from the estimated arrival time.

When there is no vehicle ID of which the reservation can be changed, in ACT51, the processor 21 determines NO and returns to ACT31 in FIG. 9.

When there is a vehicle ID of which the reservation can be changed, in ACT51, the processor 21 determines YES and proceeds to ACT52.

As ACT52, by referring to the reservation management table 221, the processor 21 updates the allocation of the vehicle ID. That is, the vehicle ID already stored in the reservation management table 221 is deleted, and the null value is set. Then, the processor 21 newly stores the vehicle ID in the field in which the null value is set in the process of ACT47. It is noted that, when a plurality of vehicle IDs correspond to vehicle IDs of which the reservation can be changed, the processor 21 selects, for example, the vehicle ID having the earliest estimated arrival time and updates the allocation.

As ACT53, by referring to the vehicle management table 222, the processor 21 updates the usage start time of the field in the same row as the vehicle ID. That is, the processor 21 deletes the usage start time already stored in the vehicle management table 222, and newly writes the usage start time before updating in the process of ACT48.

As ACT54, the processor 21 controls the communication interface 25 to transmit the usage time response command to the information terminal 10. By such control, the usage time response command is transmitted through the communication interface 25. The usage time response command is wirelessly transmitted from the access point 30 via the communication network 40 and is received by the information terminal 10 which is a time request command transmission source. The usage time response command includes the estimated arrival time, the usage time and the berth number based on the usage start time. The processor 21 that has completed the process of ACT54 returns to ACT31 of FIG. 9.

On the other hand, when the usage start time derived from the estimated arrival time is not earlier than the usage start time stored in ACT45, that is, later than the usage start time stored, in ACT45, the processor 21 determines NO and proceeds to ACT55 of FIG. 11.

As ACT55, by referring to the reservation management table 221, the processor 21 checks whether the berth is usable at the usage start time derived from the estimated arrival time.

When the berth is not usable at the usage start time derived from the estimated arrival time, in ACT55, the processor 21 determines NO and proceeds to ACT56. As ACT56, the processor 21 increases the count value n of the counter by "1." It is noted that the initial value of the count value n is "0."

As ACT57, the processor 21 checks whether the count value n is less than the upper limit value N (threshold). It is noted that the upper limit value N may be set in various manners. The upper limit value N may be a fixed value in the management server 20 or may be changeable to a desired value by a management company who manages the management server 20.

When the count value n is less than the upper limit value N, in ACT57, the processor 21 determines YES and proceeds to ACT58. When the count value n is equal to or greater than the upper limit value N, in ACT57, the processor 21 determines NO and returns to ACT31 in FIG. 9.

As ACT58, the processor 21 sets n hours after the usage start time checked in the process of ACT34 as the usage start time. For example, when the count value n is "1," the usage start time derived from the estimated arrival time cannot be used, so that one hour after that is set as the usage start time. The processor 21 that has completed the process of ACT58 returns to ACT55. That is, the processor 21 checks whether the berth is usable at the usage start time set in the process of ACT58.

When the berth is usable at the usage start time derived from the estimated arrival time, in ACT55, the processor 21 determines YES and proceeds to ACT59. It is noted that, since the processes of ACT59 and ACT60 overlaps with the description of those of ACT47 to ACT48 in FIG. 10, the description herein will be omitted.

As ACT61, the processor 21 calculates the waiting time based on the estimated arrival time and the usage start time.

As ACT62, the processor 21 controls the communication interface 25 to transmit the waiting time response command to the information terminal 10. By such control, the waiting time response command is transmitted through the communication interface 25. The waiting time response command is wirelessly transmitted from the access point 30 via the communication network 40 and is received by the information terminal 10 which is a time request command transmission source. The waiting time response command includes the estimated arrival time, the usage time and berth number based on the usage start time, and the waiting time. The processor 21 that has completed the process of ACT62 returns to ACT50 of FIG. 10. With the above-described configuration, the processor 21 ends a time request command reception process.

As is clarified from the above description, the time management system 1 includes the information terminal 10 as a terminal, the management server 20 as a server, and the calculation unit. The information terminal 10 moves together with the vehicle, that is, the conveying vehicle T using the berth. The management server 20 connects the information terminal 10 via the network.

Figure 11:
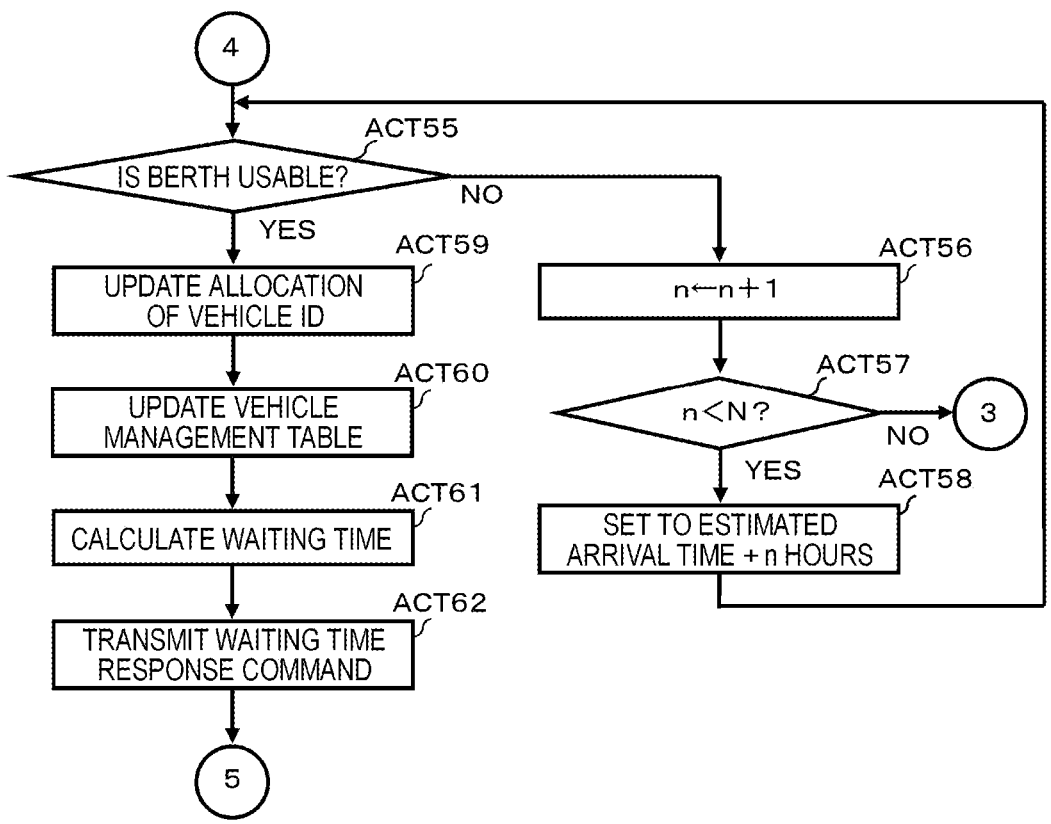
FIG. 11 is a flowchart illustrating a procedure of controlling main components of the processor in the management server.

The processor 21 of the management server 20 constitutes the allocation unit by executing the processes of ACT36 and ACT40 of FIG. 9, ACT47 and ACT52 of FIG. 10, and ACT59 of FIG. 11. That is, the management server 20 allocates the usage time of using the berth by the conveying vehicle T arriving at the berth at the estimated arrival time based on the estimated arrival time calculated by the calculation unit and a vacancy situation of the berth.

The processor 21 of the management server 20 constitutes the notification unit by executing the processes of ACT38 and ACT43 of FIG. 9, ACT49 and ACT54 of FIG. 10, and ACT62 of FIG. 11. That is, the management server 20 notifies the information terminal 10 moving together with the conveying vehicle T that uses the berth at the estimated arrival time of the usage time allocated by the allocation unit.

The processor 11 of the information terminal 10 constitutes an output unit by executing the processes of ACT8 to ACT11 of FIG. 7. That is, the information terminal 10 outputs the usage time notified from the management server 20 by displaying the usage time on the touch panel 15.

Therefore, in such a time management system 1, the driver can periodically know the estimated arrival time at the distribution facility and the berth usage time during conveyance. Then, since the estimated arrival time and the usage time are updated in response to the situation during the conveyance, the driver can efficiently perform the conveyance task and the delivery of products. When the usage time is changed to a time later than the usage time derived from the estimated arrival time due to congestion of the berth, the waiting time calculated based on the estimated arrival time and the usage start time is displayed. Therefore, the driver can effectively utilize the waiting time such as taking a break until the usage start time.

The processor 21 of the management server 20 constitutes the search unit by executing the processes of ACT50 and ACT51 of FIG. 10. That is, when the usage time that is allocated to the conveying vehicle T by the allocation unit is changed (at a change time), the management server 20 searches for another conveying vehicle T that can arrive at the berth at the usage time before the changing (the change time).

Therefore, in such a time management system 1, when the usage time is changed, another conveying vehicle T of which the reservation can be changed to the usage time before the changing is searched for. Therefore, the berth can be used efficiently.

Although the embodiment of the time management system 1 and the control program thereof has been described above, the embodiment is not limited thereto.

In the above-described embodiment, the usage time unit is set to 1 hour. The usage time may be set to, for example, 30 minutes.

In the above-described embodiment, it has been described that, when the usage start time is updated, the processor 21 of the management server 20 transmits the usage time response command or the waiting time response command to the information terminal 10. For example, even when the usage start time is not changed, the processor 21 may transmit a command to the information terminal 10. As a result, the information terminal 10 displays the usage time notification screen 200.

In the above embodiment, it has been described that the processor 11 of the information terminal 10 that has received the usage time response command or the waiting time response command allows the touch panel 15 to display the usage time notification screen 200 or the waiting time notification screen 300. For example, the output is not limited to display, and the output may be performed by voice or the like. Therefore, the driver can simplify the labor of checking the usage time notification screen 200 or the waiting time notification screen 300 displayed on the information terminal 10 during the conveyance.

In the above embodiment, it has been described that the usage time is displayed on the usage time notification screen 200 and the waiting time notification screen 300, but for example, the usage start time may be displayed.

In the above embodiment, it has been described that the processor 11 allows the touch panel 15 to display. For example, the destination input screen 100 may be displayed without displaying the log-in screen. That is, ACT1 and ACT4 in FIG. 8 may be omitted. While certain embodiments have been described, these embodiments have been presented by way of example only, and are not intended to limit the scope of the present disclosure. Indeed, the embodiments described herein may be embodied in a variety of other forms: furthermore various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A time management system for at least a first vehicle that uses a berth, the time management system comprising:
   a first terminal configured to move with the first vehicle, the first terminal comprising a transmitter;
   a calculator configured to calculate a first estimated arrival time when the first vehicle will arrive at the berth based on position information between the first terminal and the berth;
   a server configured to connect to the first terminal via a network, the server comprising:
      a processor configured to:
         allocate a first usage time of using the berth by the first vehicle based on the first estimated arrival time and a vacancy situation of the berth, and
         notify the first terminal of the first usage time; and
   a second terminal configured to move with a second vehicle;
   wherein the transmitter is configured to output the first usage time received from the server; and
   wherein the server is configured to:
      search for the second vehicle that can arrive at the berth during the first usage time before a change time that occurs at the first usage time, and
      provide a notification to the second terminal of the first usage time before the change time.

2. The time management system of claim 1, wherein the processor is configured to determine that the berth is vacant at the first estimated arrival time and, after determining that the berth is vacant at the first estimated arrival time, allocate the first usage time.

3. The time management system of claim 1, wherein the processor is configured to determine that the berth is not vacant at the first estimated arrival time and, after determining that the berth is not vacant at the first estimated arrive time, allocate the first usage time.

4. The time management system of claim 3, wherein the processor is configured to cause the transmitter to output a waiting time after determining that the berth is not vacant at the first estimated arrival time, the waiting time calculated from the first estimated arrival time and the first usage time.

5. The time management system of claim 1, wherein the calculator is configured to calculate a second estimated arrival time when the second vehicle will arrive at the berth based on position information between the second terminal and the berth.

6. The time management system of claim 5, wherein the processor is configured to:
   allocate a second usage time of using the berth by the second vehicle based on the second estimated arrival time and the vacancy situation of the berth; and
   notify the second terminal of the second usage time.

7. The time management system of claim 1, wherein allocating the first usage time based on the first estimated arrival time and the vacancy situation of the berth comprises:
   comparing the first estimated arrival time to a plurality of arrival times in a vehicle management table, and
   determining the vacancy situation based on the vehicle management table and a target arrival time of the arrival times, the target arrival time associated with the first estimated arrival time.

8. The time management system of claim 7, wherein the processor is configured to determine that the berth is vacant when an entry in the vehicle management table associated with the target arrival time does not include a vehicle identifier.

9. A server for facilitating communication with a first terminal configured to move with a first vehicle that uses a first berth and a second terminal configured to move together with a second vehicle that uses the first berth, the server comprising:
   a processor configured to:
      communicate with the first terminal;
      calculate a first estimated arrival time based on a first position of the first vehicle relative to the first berth, the first estimated arrival time being when the first vehicle is estimated to arrive at the first berth;
      allocate a first usage time of using the first berth by the first vehicle based on the first estimated arrival time and a vacancy situation of the first berth;
      notify the first terminal of the first usage time;
      search for the second vehicle that can arrive at the first berth during the first usage time before a change time that occurs at the first usage time; and
      provide a notification to the second terminal of the first usage time before the change time.

10. The server of claim 9, wherein:
the processor is configured to calculate a second estimated arrival time based on a second position of the second vehicle relative to the first berth, the second estimated arrival time being when the second vehicle is estimated to arrive at the first berth, and
compare the second estimated arrival time to the first estimated arrival time and allocate the first usage time after determining that the second estimated arrival time is after the first estimated arrival time.

11. The server of claim 10, wherein the processor is configured to:
allocate a second usage time of using the first berth by the second vehicle based on the second estimated arrival time after determining that the second estimated arrival time is after the first estimated arrival time, the second usage time being after the first usage time, and
notify the second terminal of the second usage time.

12. The server of claim 10, wherein the processor is configured to:
allocate a second usage time of using a second berth by the second vehicle based on the second estimated arrival time, and
notify the second terminal of the second usage time.

13. The server of claim 12, wherein the processor is configured to compare the second estimated arrival time to the first estimated arrival time and allocate the second usage time after determining that a portion of the second estimated arrival time overlaps with a portion of the first estimated arrival time.

14. The server of claim 10, wherein allocating the first usage time based on the first estimated arrival time and the vacancy situation of the first berth comprises:
comparing the first estimated arrival time to a plurality of arrival times in a vehicle management table, and
determining the vacancy situation based on the vehicle management table and a target arrival time of the arrival times, the target arrival time associated with the first estimated arrival time.

15. The server of claim 14, wherein the processor is configured to determine that the first berth is vacant when an entry in the vehicle management table associated with the target arrival time does not include a vehicle identifier.

16. A control method for a processor configured to communicate with a terminal configured to move with a vehicle that uses a berth, the method comprising:
calculating, by the processor, an estimated arrival time based on a position of the vehicle relative to the berth, the estimated arrival time being when the vehicle is estimated to arrive at the berth;
allocating, by the processor, a usage time of using the berth by the vehicle based on the estimated arrival time and a vacancy situation of the berth; and
notifying the terminal of the usage time;
wherein allocating the usage time based on the estimated arrival time and the vacancy situation of the berth comprises:
comparing the estimated arrival time to a plurality of arrival times in a vehicle management table, and
determining the vacancy situation based on the vehicle management table and a target arrival time of the arrival times, the target arrival time associated with the estimated arrival time.

17. The control method of claim 16, wherein allocating the usage time based on the estimated arrival time and the vacancy situation comprises determining that the berth is vacant when an entry in the vehicle management table associated with the target arrival time does not include a vehicle identifier.

18. The control method of claim 16, wherein allocating the usage time based on the estimated arrival time and the vacancy situation comprises:
determining that the berth is not vacant at the estimated arrival time;
allocating the usage time after determining that the berth is not vacant at the estimated arrive time; and
outputting a waiting time after determining that the berth is not vacant at the estimated arrival time, the waiting time calculated from the estimated arrival time and the usage time.

19. The control method of claim 16, further comprising determining that the berth is vacant when an entry in the vehicle management table associated with the target arrival time does not include a vehicle identifier.

* * * * *